(12) United States Patent
Johnston

(10) Patent No.: US 10,545,036 B2
(45) Date of Patent: Jan. 28, 2020

(54) DISTRIBUTED PARAMETER MEASUREMENTS USING MULTIPLE OPTICAL SOURCES

(71) Applicant: William Albert Johnston, Houston, TX (US)

(72) Inventor: William Albert Johnston, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 189 days.

(21) Appl. No.: 15/813,288

(22) Filed: Nov. 15, 2017

(65) Prior Publication Data

US 2018/0143041 A1 May 24, 2018

Related U.S. Application Data

(60) Provisional application No. 62/425,119, filed on Nov. 22, 2016.

(51) Int. Cl.
*G01D 5/353* (2006.01)
*E21B 47/12* (2012.01)
(Continued)

(52) U.S. Cl.
CPC ....... *G01D 5/35361* (2013.01); *E21B 47/123* (2013.01); *G01H 9/006* (2013.01); *G01V 1/52* (2013.01); *G01V 8/14* (2013.01)

(58) Field of Classification Search
CPC .... G01D 5/35361; E21B 47/123; G01V 1/52; G01V 8/14; G01H 9/006
See application file for complete search history.

(56) References Cited

U.S. PATENT DOCUMENTS 5,449,233 A * 9/1995 Sai .......... G01K 11/32
250/227.14
5,592,282 A * 1/1997 Hartog ........ G01K 11/32
250/227.18
(Continued)

FOREIGN PATENT DOCUMENTS

WO 2009006000 A2 1/2009

OTHER PUBLICATIONS

International Search Report and Written Opinion for PCT Application No. PCT/US2017/061771, dated Feb. 27, 2018, pp. 1-15.

*Primary Examiner* — John Fitzgerald
(74) *Attorney, Agent, or Firm* — Cantor Colburn LLP

(57) ABSTRACT

An embodiment of a system for measuring a parameter includes at least a first optical fiber and a second optical fiber configured to be disposed in one or more boreholes in an earth formation, the first optical fiber and the second optical fiber including a plurality of sensing locations. The system also includes a first light source configured to launch a first optical signal into at least the first optical fiber, and a second light source configured to launch a second optical signal into at least the second optical fiber, wherein the first optical signal and the second optical signal are launched at least substantially simultaneously. The system further includes a processor configured to receive measurement data generated based on backscattered signals from at least the first optical fiber and the second optical fiber the reflected signals, the processor configured estimate the parameter based on the measurement data.

19 Claims, 5 Drawing Sheets

(51) Int. Cl.
*G01H 9/00* (2006.01)
*G01V 1/52* (2006.01)
*G01V 8/14* (2006.01)

(56) References Cited

U.S. PATENT DOCUMENTS

| | | | | |
|---|---|---|---|---|
| 5,618,108 | A * | 4/1997 | Sai | G01K 11/32 250/227.14 |
| 5,956,131 | A * | 9/1999 | Mamyshev | G01M 11/3163 250/227.18 |
| 6,011,615 | A * | 1/2000 | Mamyshev | G02B 6/02247 356/634 |
| 6,141,090 | A * | 10/2000 | Mamyshev | G02B 6/02247 356/73.1 |
| 7,221,439 | B2 * | 5/2007 | Chen | G01M 11/3163 356/73.1 |
| 7,284,903 | B2 * | 10/2007 | Hartog | G01K 11/32 356/337 |
| 7,504,618 | B2 * | 3/2009 | Hartog | G01J 3/4412 250/227.14 |
| 7,808,623 | B2 * | 10/2010 | Piciaccia | G01B 11/02 356/73.1 |
| 8,672,539 | B2 * | 3/2014 | Skinner | G01K 1/14 374/1 |
| 8,947,232 | B2 * | 2/2015 | Strong | G08B 13/186 250/216 |
| 8,953,915 | B2 * | 2/2015 | Sarchi | G01K 11/32 385/101 |
| 9,032,809 | B2 * | 5/2015 | Kemnitz | G01L 1/242 73/800 |
| 9,110,018 | B2 * | 8/2015 | Handerek | E21B 47/06 |
| 9,244,009 | B2 * | 1/2016 | Handerek | E21B 47/06 |
| 9,846,259 | B2 * | 12/2017 | LeBlanc | E21B 47/123 |
| 2003/0234921 | A1 | 12/2003 | Yamate et al. | |
| 2004/0011950 | A1 * | 1/2004 | Harkins | E21B 47/065 250/269.1 |
| 2006/0245468 | A1 * | 11/2006 | Hartog | G01K 11/32 374/161 |
| 2007/0165691 | A1 | 7/2007 | Taverner et al. | |
| 2009/0008536 | A1 * | 1/2009 | Hartog | G01J 3/4412 250/227.14 |
| 2009/0097014 | A1 * | 4/2009 | Piciaccia | G01B 11/02 356/73.1 |
| 2010/0117830 | A1 * | 5/2010 | Strong | G01H 9/004 340/555 |
| 2010/0207019 | A1 | 8/2010 | Hartog et al. | |
| 2012/0039360 | A1 | 2/2012 | MacDougall et al. | |
| 2012/0082422 | A1 * | 4/2012 | Sarchi | G01K 11/32 385/101 |
| 2012/0174683 | A1 * | 7/2012 | Kemnitz | G01L 1/242 73/800 |
| 2013/0271769 | A1 * | 10/2013 | Handerek | E21B 47/06 356/446 |
| 2015/0323455 | A1 * | 11/2015 | Handerek | E21B 47/06 356/446 |
| 2015/0330844 | A1 * | 11/2015 | Oishi | G01M 11/3109 356/73.1 |
| 2016/0223711 | A1 * | 8/2016 | LeBlanc | E21B 47/102 |
| 2017/0205253 | A1 * | 7/2017 | Handerek | G01D 5/3539 |

* cited by examiner

DISTRIBUTED PARAMETER MEASUREMENTS USING MULTIPLE OPTICAL SOURCES

CROSS REFERENCE TO RELATED APPLICATIONS

This application claims the benefit of an earlier filing date from U.S. Provisional Application Ser. No. 62/425,119 filed Nov. 22, 2016, the disclosure of which is incorporated herein by reference in its entirety.

BACKGROUND

Fiber-optic sensors have been utilized in a number of applications, and have been shown to have particular utility in sensing parameters in harsh environments. Optical fibers have utility in various downhole applications including communication and measurements, e.g., to obtain various surface and downhole measurements, such as pressure, temperature, stress and strain.

Distributed Temperature Sensing (DTS) systems utilize fiber optic cables or other devices capable of measuring temperature values at multiple locations along the length of a wellbore. DTS can be used to measure, for example, a continuous temperature profile along the wellbore.

SUMMARY

An embodiment of a system for measuring a parameter includes at least a first optical fiber and a second optical fiber configured to be disposed in one or more boreholes in an earth formation, the first optical fiber and the second optical fiber including a plurality of sensing locations. The system also includes a first light source configured to launch a first optical signal into at least the first optical fiber, and a second light source configured to launch a second optical signal into at least the second optical fiber, wherein the first optical signal and the second optical signal are launched at least substantially simultaneously. The system further includes a processor configured to receive measurement data generated based on backscattered signals from at least the first optical fiber and the second optical fiber the reflected signals, the processor configured estimate the parameter based on the measurement data.

An embodiment of a method of measuring a parameter includes disposing at least a first optical fiber and a second optical fiber in one or more boreholes in an earth formation, the first optical fiber and the second optical fiber including a plurality of sensing locations. The method also includes launching a first optical signal from a first light source into at least the first optical fiber, and launching a second optical signal from a second light source into at least the second optical fiber, wherein the first optical signal and the second optical signal are launched at least substantially simultaneously. The method further includes receiving measurement data generated based on backscattered signals from at least the first optical fiber and the second optical fiber, and estimating, by a processor, the parameter based on the measurement data.

BRIEF DESCRIPTION OF THE DRAWINGS

Referring now to the drawings, wherein like elements are numbered alike in the several Figures.

DETAILED DESCRIPTION

Apparatuses, systems and methods for parameter (e.g., temperature) measurement are provided. An embodiment of a parameter measurement system includes multiple optical fibers configured to be disposed in a borehole in an earth formation. The system also includes a multi-light source interrogation system that includes at least a first light source (e.g., a first laser) connected to a first optical fiber of the multiple optical fibers, and a second light source (e.g., a second laser) connected to a second optical fiber of the multiple optical fibers. The measurement system is configured to simultaneously and separately interrogate at least the first and second optical fibers by a respective light source. In one embodiment, the first and second optical fibers are each interrogated with light having a different wavelength, which can be used to correct for differential attenuation in the optical fibers and can perform measurements simultaneously, which substantially reduces the amount of time required for measurements relative to conventional measurement systems.

Figure 1:
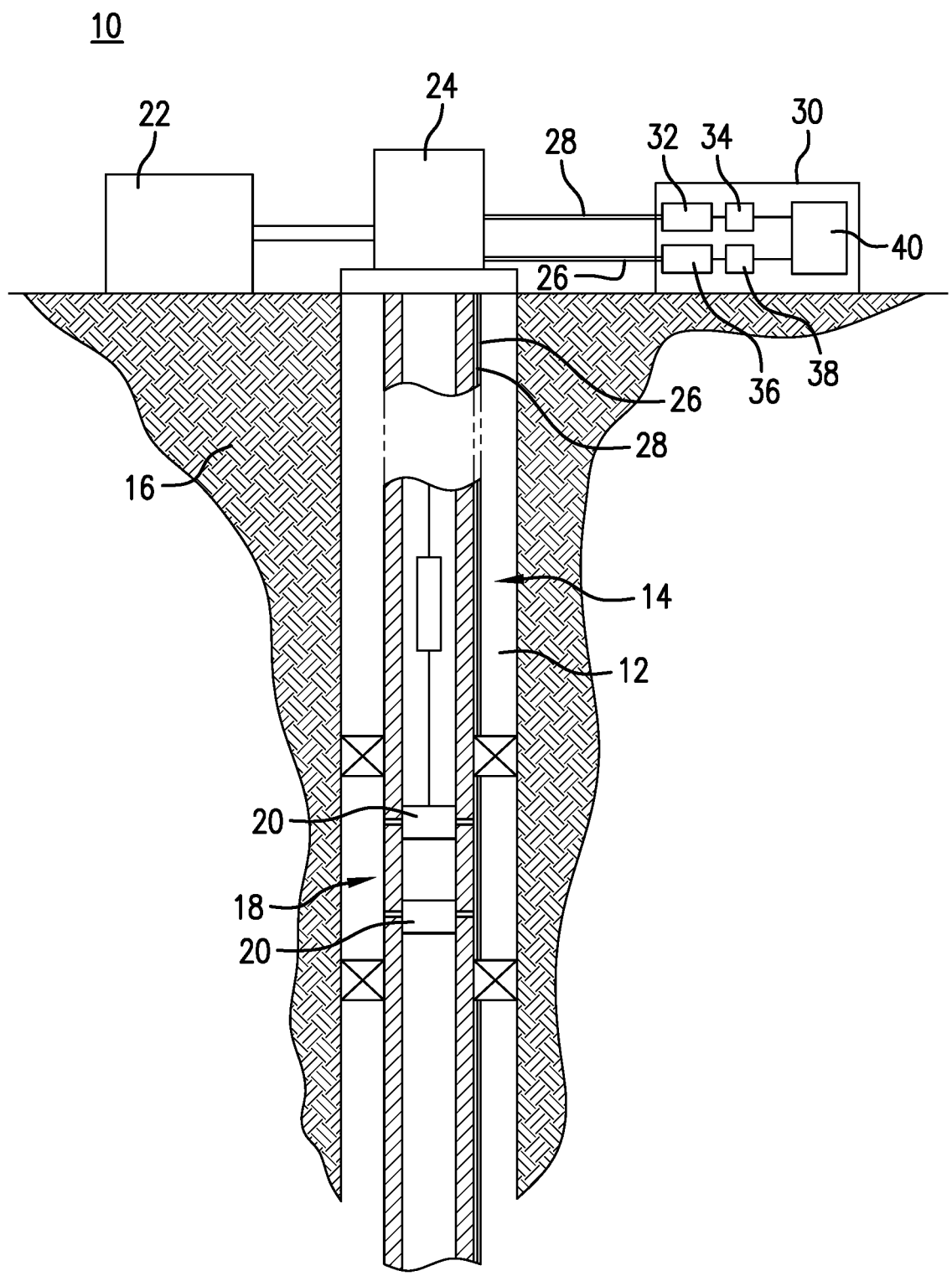
FIG. 1 is a cross-sectional view of an embodiment of a downhole drilling, monitoring, evaluation, exploration and/or production system.

Referring to FIG. 1, an exemplary embodiment of a downhole drilling, monitoring, evaluation, stimulation and/or production system 10 associated with a borehole 12 is shown. A borehole string 14 is disposed in the borehole 12, which penetrates at least one earth formation 16 for facilitating operations such as drilling, production and making measurements of properties of the formation 16 and/or the borehole 12. The borehole string 14 includes any of various components to facilitate subterranean operations. The borehole string 14 is made from, for example, a pipe, multiple pipe sections or flexible tubing. The borehole string 14 includes for example, a drilling system and/or a bottomhole assembly (BHA).

The system 10 and/or the borehole string 14 include any number of downhole tools 18 for various processes including drilling, hydrocarbon production, and formation evaluation (FE) for measuring one or more physical quantities in or around a borehole. Various measurement tools may be incorporated into the system 10 to affect measurement regimes such as wireline measurement applications or logging-while-drilling (LWD) applications.

In one embodiment, the borehole string 14 is configured as a production string and includes a tool 18 configured as a stimulation assembly as part of, for example, a bottomhole assembly (BHA). The stimulation assembly is configured to inject stimulation fluids such as hydraulic fracturing fluids and/or acid stimulation fluids into the formation. Stimulation fluids may include any suitable fluid used to reduce or eliminate an impediment to fluid production.

For example, the system 10 includes one or more injection assemblies 20 configured to control injection of stimulation fluid and direct stimulation fluid into one or more production zones in the formation. Each injection assembly 20 includes, e.g., one or more injection or flow control devices configured to direct stimulation fluid from a conduit in the string 14 to the borehole 12. A fluid source 22 may be coupled to a wellhead 24 and injected into the borehole string 14.

The system 10 also includes a measurement system configured to collect measurement data related to parameters such as downhole temperatures. The measurement system includes at least a first optical fiber sensor 26 and a second optical fiber sensor 28, which are configured to be used in combination to measure downhole properties such as temperature. The optical fiber sensors 26 and 28 may also be configured to estimate other parameters such as pressure, stress, strain, vibration and deformation of downhole components such as the borehole string 14 and the tools 18. Each of the optical fiber sensor 26 and the optical fiber sensor 28 includes at least one optical fiber having a plurality of sensing locations disposed along the length of the optical fiber. Examples of sensing locations include fiber Bragg gratings (FBG), mirrors, Fabry-Perot cavities and locations of intrinsic scattering. Locations of intrinsic scattering include points in or lengths of the fiber that reflect interrogation signals, such as Raman scattering, Brillouin scattering and/or Rayleigh scattering locations. It is noted that, although embodiments are described herein in the context of Raman and/or Rayleigh scattering, they are not so limited, as the embodiments may be applicable to temperature and/or other parameters measurements using any suitable constructed or intrinsic sensing locations that may benefit from simultaneous interrogation of optical fibers.

The optical fiber sensors 26 and 28 can be disposed in one cable or other elongated member, or disposed in separate cables, and may include additional features such as strengthening and/or protective layers or members, and additional conductors such as electrical conductors and additional optical fibers for sensing and/or communication. Although the optical fiber sensors are depicted on the production tubing, it is not so limited, as the optical fiber sensors may be located anywhere within the well bore, be cemented into the casing, or deployed temporarily through coiled tubing or wireline. In addition, although the optical fiber sensors are shown as being disposed in a single borehole, they can be separately located in different boreholes or different locations or branches of a borehole.

The measurement system also includes an interrogation unit 30 configured to transmit an electromagnetic interrogation signal into the optical fiber sensors and receive reflected signals from one or more locations in each optical fiber sensor. Interrogation signals are also referred to herein as optical signals, and may have wavelengths or wavelength ranges having any suitable value. For example, optical signals may include visible light signals and/or other light signals (e.g., ultraviolet). The interrogation unit 30 includes components such as a first optical signal source 32 (e.g., a pulsed light source, LED, laser, etc.) and a first detector 34 (e.g., a photodetector such as a photodiode) coupled to the first optical fiber sensor 26. The components also include a second signal source 36 (e.g., a pulsed light source, LED, laser, etc.) and a second detector 38 coupled to the second optical fiber sensor 28. In one embodiment, a processor 40 is in operable communication with the signal sources and/or detectors, and is configured to control the sources and receive reflected signal data from the detectors.

In the embodiments described herein, multiple fibers may be disposed at a similar or substantially the same location so that both see the same temperature, which would allow for better and faster temperature measurements. For example, two or more optical fibers may be placed in a single fiber optic cable (or individual cables can be secured or positioned together, or a dual-core or multi-core optical fiber can be coupled to multiple light sources so that multiple cores can be interrogated simultaneously. Also in the embodiments described herein, optical fibers may be disposed in multiple locations to allow for simultaneous interrogation of multiple locations. For example, two or more optical fibers can be placed in separate boreholes, so that multiple boreholes can be monitored simultaneously.

In one embodiment, the measurement system is configured as a distributed temperature sensing (DTS) system. The DTS system may utilize Spontaneous Raman Scattering (SRS) in optically transparent material in an optical fiber sensor to measure temperature. Brillouin scattering may also be utilized in measuring temperature. Raman backscatter is caused by molecular vibration in the optical fiber as a result of incident light, which causes emission of photons that are shifted in wavelength relative to the incident light. Positively shifted photons, referred to as Stokes back-scatter, are independent of temperature. Negatively shifted photons, referred to as Anti-Stokes back-scatter, are dependent on temperature. Accordingly, an intensity ratio of Stokes to Anti-Stokes back-scatter may be used to calculate temperature.

Figure 2:
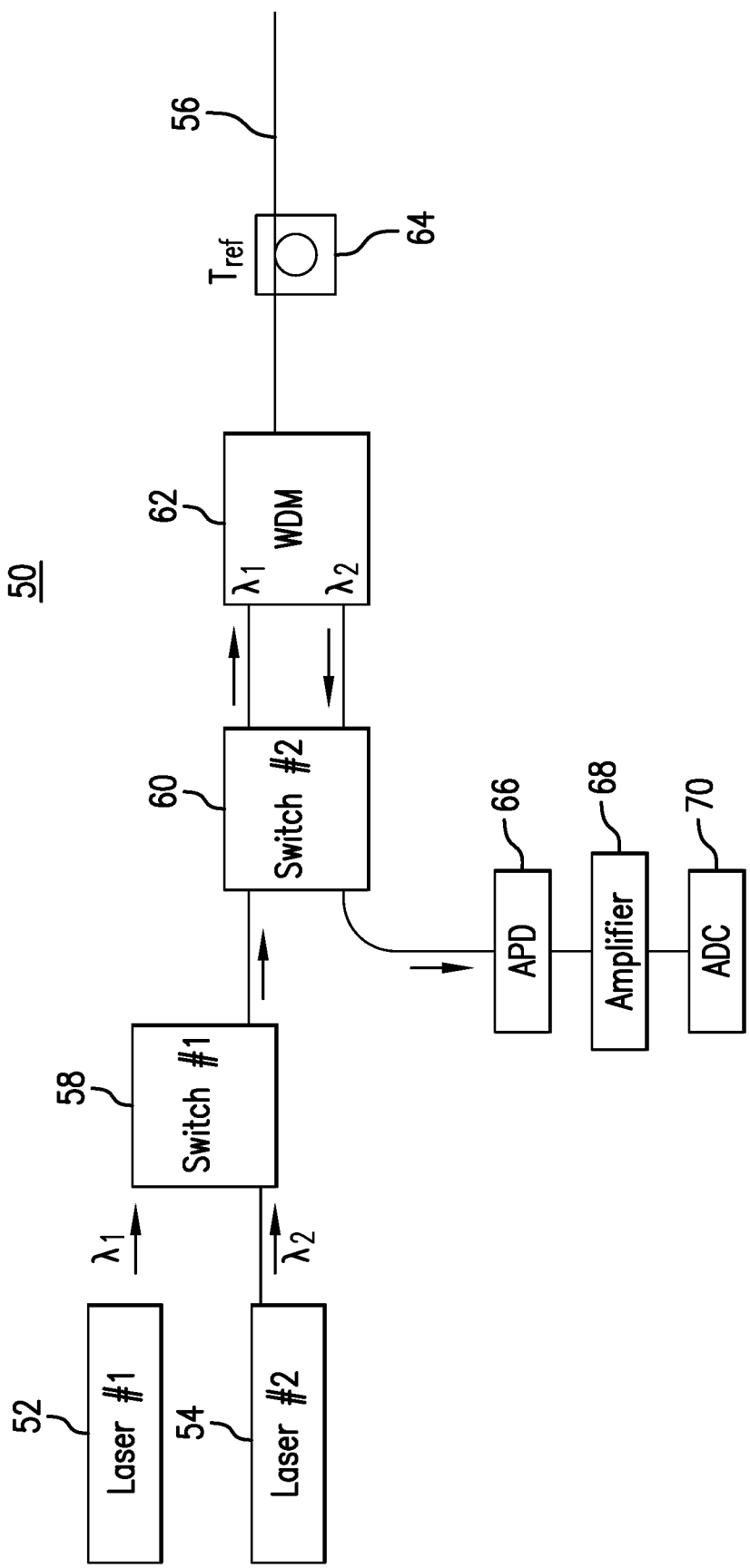
FIG. 2 depicts an embodiment of a multi-light source distributed temperature sensing (DTS) system.

FIG. 2 depicts an example of a multiple light source DTS system 50 including a first laser 52 and a second laser 54, which are used to interrogate a single optical fiber 56. The first laser 52 emits an optical signal having a first wavelength $\lambda_1$ (e.g., a Stokes wavelength), and the second laser 54 emits an optical signal having a second wavelength $\lambda_2$ (e.g., an anti-Stokes wavelength). A switch 58 is operable to alternate between interrogating the optical fiber 56 with the wavelengths $\lambda_1$ and $\lambda_2$. Another switch 60 is optically connected to the first switch 58 and to a wavelength division multiplexer (WDM) 62 configured to control which wavelength is launched into the optical fiber 56. Optical signals are backscattered from various locations along the optical fiber 56, which optionally includes a reference coil 64 for providing a reference signal. Backscattered signals are transmitted via the switch 60 to a detection assembly. The detection assembly includes, for example, an optical detector 66 such as an avalanche photodiode (APD), an amplifier 68 and an analog to digital converter (ADC) 70. The output from the detection assembly is transmitted to a suitable processing device such as the interrogation unit 30 of FIG. 1. In this example, each laser is used only a fraction of the time (e.g., about 50%) during a measurement acquisition window, which leads to a reduction in resolution compared to a single laser DTS system.

Figure 3:
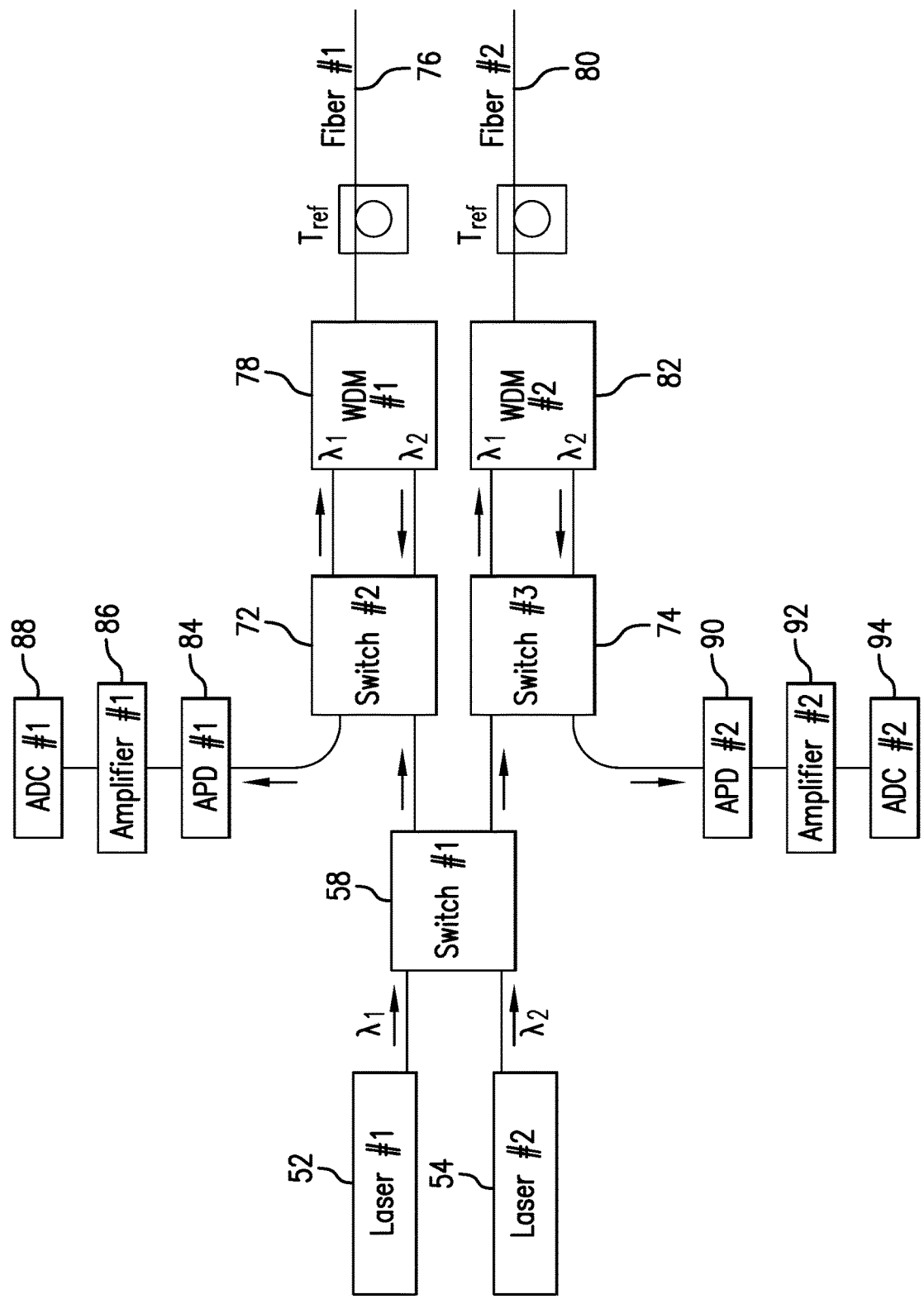
FIG. 3 depicts an embodiment of a multi-light source distributed temperature sensing (DTS) system configured for simultaneous interrogation of optical fibers.

FIG. 3 depicts an embodiment of the multiple light source DTS system 50 that is configured to allow for simultaneous (or at least substantially simultaneous) interrogation of optical fibers using multiple light sources. In this embodiment, the system 50 includes additional switches 72 and 74, which are optically coupled to a plurality of optical fibers. For example, the switch 72 is coupled to a first optical fiber 76 via a WDM 78, and the switch 74 is coupled to a second optical fiber 80 via a WDM 82. Backscattered signals from the first optical fiber 76 are transmitted to a first detection assembly including an optical detector 84, an amplifier 86 and an ADC 88. Likewise, backscattered signals from the second optical fiber 80 are transmitted to a second detection assembly including an optical detector 90, an amplifier 92 and an ADC 94. In this embodiment, the first fiber 76 is interrogated via the first laser 52, and simultaneously (e.g., within the same measurement window) the second fiber 80 is interrogated via the second laser 54. Thus, both lasers can be used 100% of the time during a measurement window. The system 50 in this embodiment may be used to simultaneously interrogate fibers for various purposes, such as Raman scattering reflectometry (e.g., simultaneously interrogating with Stokes and anti-Stokes wavelengths), interrogating fibers using multiple measurement regimes (e.g., Raman and Rayleigh spectroscopy), and simultaneously interrogating fibers at different locations (e.g., in different boreholes).

In one embodiment, the system 50 uses two lasers at different wavelengths to measure temperature and correct for differential attenuation in the fiber. Useful combinations of wavelengths include 1030 nm and 1064 nm, as well as 1460 nm and 1550 nm. For example, the laser 52 emits a first optical signal having a wavelength of 1460 nm into the first optical fiber 76 over a first selected time window (e.g., the laser is turned on at time $t_1$ and turned off at time $t_2$). The laser 54 emits a second optical signal having a wavelength of 1550 nm into the second optical fiber 80 over at least substantially the same first selected time window (e.g., the laser is turned on at time $t_1$ and turned off at time $t_2$). Raman Stokes backscatter centered on 1550 nm and anti-Stokes backscatter centered at 1460 nm is collected. The laser 52 and the laser 54 then emit signals over a second selected time window. For example, the laser 52 emits a third optical signal having a wavelength of 1460 nm into the second optical fiber 80 over the second time window (e.g., the laser is turned on at time $t_3$ and turned off at time $t_4$). The laser 54 emits a fourth optical signal having a wavelength of 1550 nm into the first optical fiber 76 over at least substantially the same selected second time window (e.g., the laser is turned on at time $t_3$ and turned off at time $t_4$). An anti-Stokes/Stokes ratio is calculated for fiber 76 using the Stokes and anti-Stokes from signals one and four to estimate the temperature of fiber 76. As both the Stokes and anti-Stokes signals see the same attenuation, the attenuation effects completely cancel out when the ratio is calculated. Similarly, an anti-Stokes/Stokes ratio is calculated for fiber 80 using the Stokes and anti-Stokes from signals two and three to estimate the temperature of fiber 80.

Figure 4:
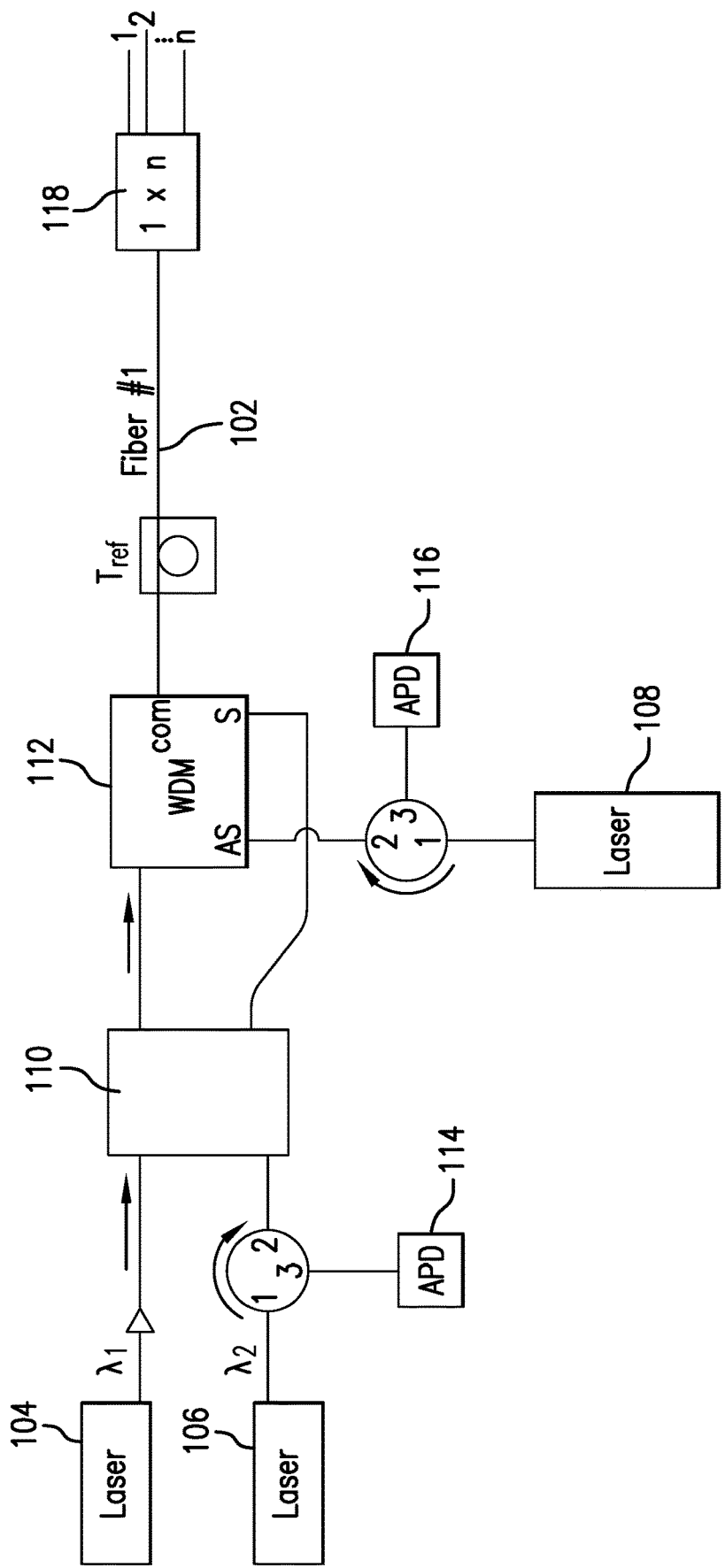
FIG. 4 depicts an embodiment of a multi-light source DTS system that is at least substantially insensitive to hydrogen diffusion and is configured for simultaneous interrogation of optical fibers.
Figure 5:
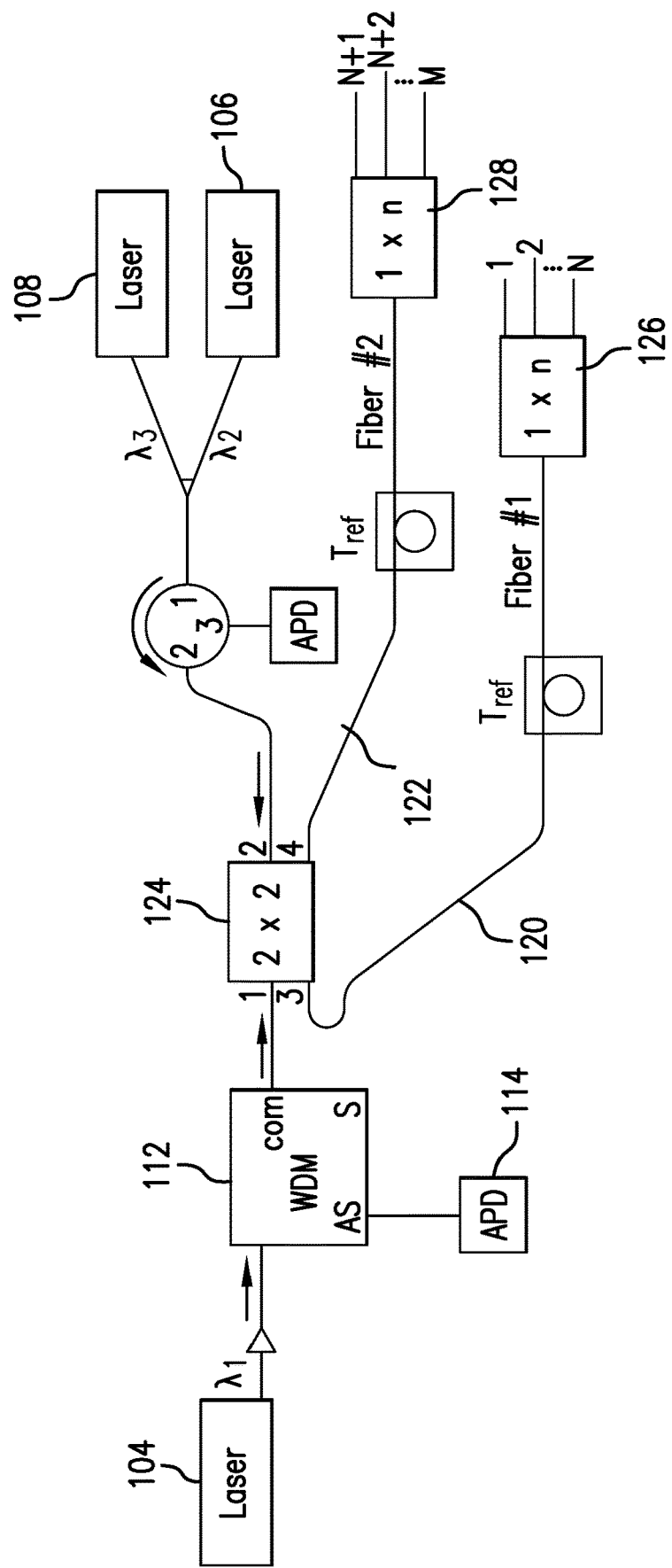
FIG. 5 depicts an embodiment of a multi-light source DTS system that is at least substantially insensitive to hydrogen diffusion and is configured for simultaneous interrogation of optical fibers.

FIGS. 4 and 5 illustrate embodiments of a multi-light source system 100 that features three light sources optically connected to multiple optical fibers for measurement of temperature and/or other parameters. The system 100 may be used to measure temperature based on a comparison between Raman scattering and Rayleigh scattering in optical fibers. For example, temperature is calculated based on a ratio of the anti-Stokes Raman scattering to the Rayleigh scattering to determine temperature. Rayleigh traces may also be acquired for differential attenuation correction. The system 100 may be applicable to single mode and/or multimode optical fiber systems. It is noted that the configuration of the system 100 is not limited to that shown in FIGS. 4 and 5.

The system 100 of FIG. 4 includes an optical fiber 102, a first light source 104 configured to emit an optical signal having a first wavelength $\lambda_1$ (e.g., a Stokes or anti-Stokes wavelength), a second light source 106 configured to emit an optical signal having a second wavelength $\lambda_2$ (e.g., a Rayleigh scattering signal) and a third light source 108 configured to emit a signal having a third wavelength $\lambda_3$ (e.g., a Rayleigh scattering signal). The wavelengths may be the same or different. For example, the signals from the sources 104 and 106 may have the same wavelength but different intensities.

The light source 104 is connected to a switch 110 and a WDM 112 for launching a first signal into the fiber 102. The light source 106 is connected to the switch 110 and a photodetector 114 (via a circulator). The light source 108 is also connected to a photodetector 116 and the WDM 112. Multiple fibers (referred to as optical fibers 1–N) may be connected to the optical fiber 102 via, e.g., a 1×N channel switch 118 to allow interrogation of multiple locations (e.g., multiple boreholes).

In the system of FIG. 4, optical signals from each light source may be sequentially applied to the optical fiber 102 and backscattering signals detected. For example, light intensity resulting from Stokes Raman backscatter or anti-Stokes Raman backscatter (from the optical signal launched by the first light source 104), and light intensity of Rayleigh backscatter resulting from the optical signals emitted by the second source 106 and the third source 108 are acquired. Temperature can then be calculated by comparing the intensities of the backscatter.

For example, the first light source 104 is a relatively high power 1550 nm laser for obtaining anti-Stokes traces, the second light source 106 is a relatively low powered 1550 nm laser for obtaining Rayleigh loss traces at 1550 nm, and the third light source 108 is a 1450 nm laser for obtaining Rayleigh traces at 1450 nm. In this configuration, the lasers are fired sequentially, e.g., x seconds of data are collected using the high-powered 1550 nm laser, then x seconds of data are collected using the low-powered 1550 nm laser, and finally x seconds of data are collected using the 1450 nm laser. Since Rayleigh scatter results in significantly stronger backscatter than Raman scatter, the Rayleigh traces may be collected faster than the Raman traces, but a significant amount of time is still used for measuring the fiber losses.

FIG. 5 shows an embodiment of the system 100 that is at least substantially insensitive to hydrogen darkening (as is the embodiment of FIG. 4), but also provides update rates that are significantly faster than the embodiment of FIG. 4 and other multi-light source configurations.

The embodiment of FIG. 5 includes a plurality of optical fibers that can be interrogated simultaneously. Traditional dual laser or dual ended configurations require measuring twice as many raw signals (e.g., Optical Frequency Time Domain Reflectometry (OTDR) traces) as a single laser, single ended configuration, which hurts the update rate by at least a factor of root-two. The embodiment of FIG. 5 provides for faster update rates (at least similar to single laser configurations) while maintaining the ability to eliminate or compensate for darkening.

The system 100 in FIG. 5 includes multiple fibers, e.g., two optical fibers 120 and 122, which can be simultaneously interrogated. The light sources are configured so that each light source can be used to interrogate both of the optical fibers 120 and 122. For example, the light sources 104, 106 and 108 are connected to the optical fibers 120 and 122 via a 2×2 switch 124 that allows the fibers 120 and 122 to be simultaneously interrogated. The fibers 120 and/or 122 can each be connected to multiple additional fibers via, e.g., 1×N channel switches 126 and 128.

For example, the 1×N switch 126 is connected to a number N of fibers (referred to as optical fibers 1, 2, 3 . . . N) deployed in N boreholes. The 1×N switch 128 is connected to another number M-N of fibers (referred to as optical fibers N+1, N+2, N+3 . . . M) deployed in M-N boreholes. Depending on the state of the 2×2 switch 124, Rayleigh traces may be collected on one of the fibers 1, 2, 3 . . . N, while simultaneously Stokes or anti-Stokes traces are collected on one of the fibers N+1, N+2, N+3 . . . M. In this way the system 100 can be operable to continuously interrogate loss traces and anti-Stokes traces, resulting in a clear improvement in update rate.

Embodiments described herein can be utilized in various methods, such as methods of measuring temperature and/or other parameters in one or more boreholes. For example, the interrogation unit 30 launches optical signals having a Stokes wavelength into the first optical fiber 76 (FIG. 3) and at least substantially simultaneously launches optical signals having an anti-Stokes wavelength into the second optical fiber 80. Return signals backscattered from sensing locations in the optical fibers are detected and correlated with distance and/or time (e.g., via optical time domain reflectometry or OTDR), and are processed to estimate a ratio between the intensity of Stokes and anti-Stokes return signals to estimate temperature at one or more locations along the borehole.

In another example, the interrogation unit 30 launches optical signals having a Stokes or anti-Stokes wavelength into the first optical fiber 120 (FIG. 3) and at least substantially simultaneously launches optical signals for measuring Rayleigh backscatter into the second optical fiber 122. Temperature is then calculated based on a comparison (e.g., a ratio) between the Rayleigh backscatter intensity and the Stokes or anti-Stokes backscatter intensity. As discussed above, the method in this example may be used to simultaneously interrogate optical fibers in different boreholes to increase the update rate and decrease the amount of time required to acquire measurements.

The systems and methods described herein provide various advantages over prior art techniques. The systems and methods provide a mechanism to measure temperature changes (and/or other parameter changes) with improved update rates and resolutions, and can also improve the time required to interrogate multiple locations (e.g., multiple boreholes). In addition, the embodiments described herein can be realized by incorporating additional optical fibers to existing systems without requiring excessive re-configuration or excessive additional cost.

One drawback of conventional dual laser DTS systems is that Stokes or anti-Stokes traces are typically only collected for 50% of a measurement window or measurement period. Embodiments described herein represent an improvement in that both lasers in the dual laser system can be operated 100% of the time while illuminating different fibers. For example, while Stokes backscatter is collected with one fiber, anti-Stokes backscatter is collected with another fiber. Then after half of a measurement period, the fiber being interrogated with each laser is switched. This technique greatly improves the measurement capabilities of a dual laser DTS system.

Set forth below are some embodiments of the foregoing disclosure:

Embodiment 1: A system for measuring a parameter, comprising at least a first optical fiber and a second optical fiber configured to be disposed in one or more boreholes in an earth formation, the first optical fiber and the second optical fiber including a plurality of sensing locations; a first light source configured to launch a first optical signal into the first optical fiber; a second light source configured to launch a second optical signal into the second optical fiber, wherein the first optical signal and the second optical signal are launched at least substantially simultaneously; an optical switch configured to cause the first light source to launch a third optical signal into the second optical fiber and the second light source to launch a fourth optical signal into the first optical fiber, wherein the third optical signal and the fourth optical signal are launched at least substantially simultaneously; and a processor configured to receive measurement data generated based on backscattered signals from at least the first optical fiber and the second optical fiber, and estimate the parameter based on the measurement data.

Embodiment 2: The system of any prior embodiment, wherein the processor is configured to estimate the parameter based on a ratio of an intensity of a return signal based on the first optical signal and an intensity of a return signal based on the second optical signal.

Embodiment 3: The system of any prior embodiment, wherein the parameter is a temperature.

Embodiment 4: The system of any prior embodiment, wherein the first optical signal has a Stokes wavelength and the second optical signal has an anti-Stokes wavelength.

Embodiment 5: The system of any prior embodiment, wherein the processor is configured to estimate the temperature of each fiber based on a ratio of an intensity of the backscattered signal based on the Stokes wavelength and an intensity of the backscattered signal based on the anti-Stokes wavelength.

Embodiment 6: The system of any prior embodiment, wherein the first optical signal is configured to result in Rayleigh backscatter, and the second optical signal has a Stokes wavelength or an anti-Stokes wavelength.

Embodiment 7: The system of any prior embodiment, wherein the processor is configured to estimate the temperature of each fiber based on a ratio of an intensity of the Rayleigh backscatter and an intensity of the backscattered signal based on the Stokes wavelength.

Embodiment 8: The system of any prior embodiment, wherein the processor is configured to estimate the temperature of each fiber based on a ratio of an intensity of the Rayleigh backscatter and an intensity of the backscattered signal based on the anti-Stokes wavelength.

Embodiment 9: A method of measuring a parameter, comprising disposing at least a first optical fiber and a second optical fiber in one or more boreholes in an earth formation, the first optical fiber and the second optical fiber including a plurality of sensing locations; launching a first optical signal from a first light source into the first optical fiber; launching a second optical signal from a second light source into the second optical fiber, wherein the first optical signal and the second optical signal are launched at least substantially simultaneously; launching a third optical signal from the first light source into the second optical fiber; launching a fourth optical signal from the second light source into the first optical fiber, wherein the third optical signal and the fourth optical signal are launched at least substantially simultaneously; receiving measurement data generated based on backscattered signals from at least the first optical fiber and the second optical fiber; and estimating, by a processor, the parameter based on the measurement data.

Embodiment 10: The method of any prior embodiment, wherein the estimating the parameter is based on a ratio of an intensity of a return signal based on the first optical signal and an intensity of a return signal based on the second optical signal.

Embodiment 11: The method of any prior embodiment, wherein the estimating the parameter includes measuring a temperature.

Embodiment 12: The method of any prior embodiment, wherein the launching the first optical signal includes launching a signal with Stokes wavelength and the launching the second optical signal includes launching an anti-Stokes wavelength.

Embodiment 13: The method of any prior embodiment, wherein the estimating the temperature is based on a ratio of an intensity of the backscattered signal based on the Stokes wavelength and an intensity of the backscattered signal based on the anti-Stokes wavelength.

Embodiment 14: The method of any prior embodiment, wherein the launching the first optical signal includes launching a signal with Stokes wavelength or an anti-Stokes wavelength, and the launching the second optical signal includes launching a signal configured to result in Rayleigh backscatter.

Embodiment 15: The method of any prior embodiment, wherein the estimating the temperature is based on a ratio of an intensity of the Rayleigh backscatter and an intensity of the backscattered signal based on the Stokes wavelength.

Embodiment 16: The method of any prior embodiment, wherein the estimating the temperature is based on a ratio of an intensity of the Rayleigh backscatter and an intensity of the backscattered signal based on the anti-Stokes wavelength.

Embodiment 17: A borehole system, comprising a borehole; a tubing string comprising one or more downhole tools; and a system for measuring a parameter, the system comprising at least a first optical fiber and a second optical fiber configured to be disposed in one or more boreholes in an earth formation, the first optical fiber and the second optical fiber including a plurality of sensing locations; a first light source configured to launch a first optical signal into the first optical fiber; a second light source configured to launch a second optical signal into the second optical fiber, wherein the first optical signal and the second optical signal are launched at least substantially simultaneously; an optical switch configured to cause the first light source to launch a third optical signal into the second optical fiber and the second light source to launch a fourth optical signal into the first optical fiber, wherein the third optical signal and the fourth optical signal are launched at least substantially simultaneously; and a processor configured to receive measurement data generated based on backscattered signals from at least the first optical fiber and the second optical fiber, and estimate the parameter based on the measurement data.

Embodiment 18: The borehole system of any prior embodiment, wherein the parameter is a temperature.

Embodiment 19: The borehole system of any prior embodiment, wherein the processor is configured to estimate the parameter based on a ratio of an intensity of a return signal based on the first optical signal and an intensity of a return signal based on the second optical signal.

Embodiment 20: The borehole system of any prior embodiment, wherein the processor is configured to estimate the parameter as a ratio of the backscattered signal resulting from the first optical signal and the backscattered signal resulting from the second optical signal.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for measuring a parameter, comprising:
    at least a first optical fiber and a second optical fiber configured to be disposed in one or more boreholes in an earth formation, the first optical fiber and the second optical fiber including a plurality of sensing locations;
    a first light source configured to launch a first optical signal into the first optical fiber;
    a second light source configured to launch a second optical signal into the second optical fiber, wherein the first optical signal and the second optical signal are launched at least substantially simultaneously;
    an optical switch configured to cause the first light source to launch a third optical signal into the second optical fiber and the second light source to launch a fourth optical signal into the first optical fiber, wherein the third optical signal and the fourth optical signal are launched at least substantially simultaneously; and
    a processor configured to receive measurement data generated based on backscattered signals from at least the first optical fiber and the second optical fiber, and estimate the parameter based on the measurement data.

2. The system of claim 1, wherein the processor is configured to estimate the parameter based on a ratio of an intensity of a return signal based on the first optical signal and an intensity of a return signal based on the second optical signal.

3. The system of claim 1, wherein a wavelength of the first optical signal is 1030 nanometers (nm) and a wavelength of the second optical signal is 1064 nm or the wavelength of the first optical signal is 1460 nm and the wavelength of the second optical signal is 1550 nm.

4. The system of claim 1, wherein the parameter is a temperature.

5. The system of claim 4, wherein the first optical signal has a Stokes wavelength and the second optical signal has an anti-Stokes wavelength.

6. The system of claim 5, wherein the processor is configured to estimate the temperature along each fiber based on a ratio of an intensity of the backscattered signal based on the Stokes wavelength and an intensity of the backscattered signal based on the anti-Stokes wavelength.

7. The system of claim 4, wherein the first optical signal is configured to result in Rayleigh backscatter, and the second optical signal has a Stokes wavelength or an anti-Stokes wavelength.

8. The system of claim 7, wherein the processor is configured to estimate the temperature along each fiber based on a ratio of an intensity of the Rayleigh backscatter and an intensity of the backscattered signal based on the Stokes wavelength.

9. The system of claim 7, wherein the processor is configured to estimate the temperature of each fiber based on a ratio of an intensity of the Rayleigh backscatter and an intensity of the backscattered signal based on the anti-Stokes wavelength.

10. A borehole system, comprising:
a borehole;
a tubing string comprising one or more downhole tools; and
a system for measuring a parameter, the system comprising:
at least a first optical fiber and a second optical fiber configured to be disposed in one or more boreholes in an earth formation, the first optical fiber and the second optical fiber including a plurality of sensing locations;
a first light source configured to launch a first optical signal into the first optical fiber;
a second light source configured to launch a second optical signal into the second optical fiber, wherein the first optical signal and the second optical signal are launched at least substantially simultaneously;
an optical switch configured to cause the first light source to launch a third optical signal into the second optical fiber and the second light source to launch a fourth optical signal into the first optical fiber, wherein the third optical signal and the fourth optical signal are launched at least substantially simultaneously; and
a processor configured to receive measurement data generated based on backscattered signals from at least the first optical fiber and the second optical fiber, and estimate the parameter based on the measurement data.

11. The borehole system of claim 10, wherein the processor is configured to estimate the parameter based on a ratio of an intensity of a return signal based on the first optical signal and an intensity of a return signal based on the second optical signal.

12. The borehole system of claim 10, wherein the processor is configured to estimate the parameter as a ratio of the backscattered signal resulting from the first optical signal and the backscattered signal resulting from the second optical signal.

13. The borehole system of claim 10, wherein a wavelength of the first optical signal is 1030 nanometers (nm) and a wavelength of the second optical signal is 1064 nm or the wavelength of the first optical signal is 1460 nm and the wavelength of the second optical signal is 1550 nm.

14. The borehole system of claim 10, wherein the parameter is a temperature.

15. The borehole system of claim 14, wherein the first optical signal has a Stokes wavelength and the second optical signal has an anti-Stokes wavelength.

16. The borehole system of claim 15, wherein the processor is configured to estimate the temperature along each fiber based on a ratio of an intensity of the backscattered signal based on the Stokes wavelength and an intensity of the backscattered signal based on the anti-Stokes wavelength.

17. The borehole system of claim 14, wherein the first optical signal is configured to result in Rayleigh backscatter, and the second optical signal has a Stokes wavelength or an anti-Stokes wavelength.

18. The borehole system of claim 17, wherein the processor is configured to estimate the temperature along each fiber based on a ratio of an intensity of the Rayleigh backscatter and an intensity of the backscattered signal based on the Stokes wavelength.

19. The borehole system of claim 17, wherein the processor is configured to estimate the temperature along each fiber based on a ratio of an intensity of the Rayleigh backscatter and an intensity of the backscattered signal based on the anti-Stokes wavelength.

* * * * *